United States Patent Office 3,000,978
Patented Sept. 19, 1961

3,000,978
NOVEL COMPOSITION
Robert H. Fredenburg, Barberton, Ohio, assignor, by mesne assignments, to Pittsburgh Plate Glass Company
No Drawing. Filed Nov. 12, 1959, Ser. No. 852,179
4 Claims. (Cl. 260—652.5)

This invention deals with methylchloroform. More particularly, it concerns the stabilization of methylchloroform.

Methylchloroform (1,1,1-trichloroethane) is one of the least stable of these normally liquid chlorinated aliphatic hydrocarbons useful as industrial solvents. It evidences strong decomposition tendencies, especially under conditions which prevail in its use as an industrial solvent. For example, when in contact with light metals such as aluminum, it attacks the metal, evolves hydrogen chloride and turns black.

It now has been discovered that tertiary-butyl alcohol is useful in stabilizing methylchloroform. Methylchloroform containing a small amount of tertiary-butyl alcohol, e.g., about 3 percent by weight of the alcohol, manifests increased resistance to decomposition. Thus, in accordance with this invention, stability of methylchloroform is improved by dissolving therein tertiary-butyl alcohol.

The concentrations of tertiary-butyl alcohol useful in improving methylchloroform stability is variable. Particularly useful are tertiary-butyl alcohol concentrations of from about 0.5 to 10 percent or even higher, preferably 2 to 5 percent, by weight of the methylchloroform.

The following example illustrates the specific stabilizing effect of tertiary-butyl alcohol:

EXAMPLE

Stability of methylchloroform containing various alcohols was determined by immersing a small aluminum strip (½ by $\frac{1}{16}$ by 2 inches) in 50 cubic centimeters of the methylchloroform within a 250 cubic centimeter glass flask and refluxing under atmospheric conditions the methylchloroform under total reflux. Refluxing was continued until decomposition of methylchloroform was observed as indicated by formation of black tars, evolution of hydrogen chloride and/or appearance of precipitate. The following is a tabulation of observed results:

Stabilizer

| Name | Concentration, Percent by Weight | Reflux Time Before Decomposition (Hours) |
|---|---|---|
| none | | 0.1 |
| ethanol | 3.0 | 11 |
| propanol | 3.0 | 0.1 |
| isopropanol | 3.0 | 1.0 |
| sec-butanol | 3.0 | 0.25 |
| t-amyl alcohol | 3.0 | 0.5 |
| t-butyl alcohol | 3.0 | [1] 500 |

[1] After 500 hours, refluxing was stopped although no decomposition was observed.

From the foregoing data, it is clear tertiary-butyl alcohol is unique in its effect upon methylchloroform.

While the invention is described with reference to specific details, it is not intended that it be construed as limited to such details except insofar as such details appear in the appended claims.

I claim:

1. Methylchloroform containing tertiary-butyl alcohol in stabilizing concentration.

2. Methylchloroform containing from 0.5 to 10 weight percent tertiary-butyl alcohol.

3. A method of stabilizing methylchloroform which comprises adding thereto a stabilizing concentration of tertiary-butyl alcohol.

4. A method of stabilizing methylchloroform which comprises adding thereto from 0.5 to 10 weight percent of tertiary-butyl alcohol.

References Cited in the file of this patent
UNITED STATES PATENTS

| 2,371,644 | Petering et al. | Mar. 20, 1945 |
| 2,407,149 | Gardenier | Sept. 3, 1946 |

Dedication 3,000,978.—*Robert H. Fredenburg*, Barberton, Ohio. NOVEL COMPOSITION. Patent dated Sept. 19, 1961. Dedication filed Nov. 2, 1973, by the assignee, *PPG Industries, Inc.*

Hereby dedicates to the Public the entire remaining term of said patent.

[*Official Gazette February 19, 1974.*]